(12) United States Patent  (10) Patent No.: US 7,721,529 B2
Kesse et al.  (45) Date of Patent: May 25, 2010

(54) EXHAUST SYSTEM PROVIDING IN SITU SENSOR CALIBRATION

(75) Inventors: Mary Louise Kesse, Peoria, IL (US); Paul Adam Gamble, Peoria, IL (US); James Joshua Driscoll, Dunlap, IL (US); Michael Paul Withrow, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 11/606,172

(22) Filed: Nov. 30, 2006

(65) Prior Publication Data

US 2008/0127633 A1 Jun. 5, 2008

(51) Int. Cl.
*F01N 3/00* (2006.01)
(52) U.S. Cl. ............................ 60/277; 60/274; 60/276; 60/287; 60/288; 60/292; 73/23.31; 73/116.01; 73/116.03; 436/137
(58) Field of Classification Search .................. 60/274, 60/276, 277, 287, 288, 289, 292; 73/23.31, 73/116.01, 116.03; 436/137
See application file for complete search history.

(56) References Cited

U.S. PATENT DOCUMENTS

| | | | |
|---|---|---|---|
| 4,532,013 A | 7/1985 | Dietz et al. | |
| 5,918,256 A * | 6/1999 | Delaney | 73/23.31 |
| 6,200,819 B1 * | 3/2001 | Harvey et al. | 436/179 |
| 6,254,750 B1 | 7/2001 | Patrick et al. | |
| 6,375,828 B2 | 4/2002 | Ando et al. | |
| 6,454,931 B2 | 9/2002 | Patrick et al. | |
| 6,604,007 B2 * | 8/2003 | Leven et al. | 700/79 |
| 6,623,975 B1 * | 9/2003 | Tefft et al. | 436/137 |
| 6,721,649 B2 * | 4/2004 | Knott et al. | 701/114 |
| 6,743,352 B2 | 6/2004 | Ando et al. | |
| 6,901,745 B2 * | 6/2005 | Schnaibel et al. | 60/285 |
| 6,923,902 B2 | 8/2005 | Ando et al. | |

* cited by examiner

*Primary Examiner*—Binh Q Tran
(74) *Attorney, Agent, or Firm*—Finnegan, Henderson, Farabow, Garrett & Dunner (57) ABSTRACT

An exhaust system for a combustion source is disclosed. The exhaust system may have a passageway connected to receive an exhaust flow from the combustion source, and a sensor disposed within the passageway. The sensor may generate a signal indicative of the concentration of a constituent in the exhaust flow. The exhaust system may also have a controller in communication with the sensor to receive the signal. The controller may be configured to selectively communicate a flow of calibration gas with the sensor during operation of the combustion source, and compare the signal received during the selective communication with a reference value. The controller may be further configured to adjust the sensor output in response to the comparison.

22 Claims, 4 Drawing Sheets

EXHAUST SYSTEM PROVIDING IN SITU SENSOR CALIBRATION

TECHNICAL FIELD

The present disclosure is directed to an exhaust system and, more particularly, to an exhaust system providing in situ calibration of a NOx sensor.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, oxides of nitrogen (NOx). Due to increased awareness of the environment, exhaust emission standards have become more stringent, and the amount of gaseous compounds emitted from an engine may be regulated depending on the type of engine, size of engine, and/or class of engine. In order to ensure compliance with the regulation of these compounds, the regulating agencies have required the use of sensors located at the tail pipe opening of the engine.

Although sensors for measuring the gaseous emissions of engines are currently available in today's market, the sensors can, over time, lose their sensitivity. That is, the sensors and other components affecting sensor readings may become corroded, covered with layers of dirt, exposed to temperature extremes, or suffer other performance-degrading effects. In response to this exposure, the accuracy of the readings from the sensor may drift away from an acceptable range. In order to ensure continued performance of the sensors, the sensors must be periodically recalibrated.

In the past, calibration of such a sensor was accomplished outside of the typical operating environment of the sensor. Specifically, the sensor was removed from its operating environment (i.e., the engine or the furnace into which it was installed) and sent to a lab or installed into a separate calibration machine. The accuracy of the sensor was then tested, and the sensor recalibrated for any drift that might have occurred. Although this method may have improved the readings from the sensor, it was difficult, time-consuming, and expensive. In addition, other factors external to the sensor that could be affecting the drift were not accounted for.

One method utilized to decrease the amount of time and resources consumed during sensor calibration is described in U.S. Pat. No. 4,532,013 (the '013 patent) issued to Dietz et al. on Jul. 30, 1985. Specifically, the '013 patent discloses testing and recalibrating an engine's sensor in situ. The sensor is calibrated by exposing it from time to time to ambient air, of known oxygen concentration. Since automotive vehicles, as well as many heating or furnace installations, are not operating continuously around the clock, use of ambient air is feasible and eminently suitable as a reference gas. When the combustion process is interrupted, it is thus possible to calibrate the sensor by comparing the current output of the air-exposed sensor to a reference current value. If the deviation between the current output with the reference current value from original data is excessive, a fuel/air adjustment element is disabled and an alarm is sounded. In addition, the sensor may be adjusted to bring the accuracy of the sensor back within an acceptable range.

Although the method described in the '013 patent may suitably recalibrate a sensor, it's use may be limited. Specifically, because the sensor may be calibrated only when the engine is turned off, the method may be inapplicable to machines that operate continuously. Further, even for those vehicles whose operation is periodically interrupted, the readings from the sensor may still drift undesirably during operation, depending on the time duration between these calibration opportunities.

The exhaust system of the present disclosure solves one or more of the problems set forth above.

SUMMARY OF THE INVENTION

One aspect of the present disclosure is directed to an exhaust system for a combustion source. The exhaust system may include a passageway connected to receive an exhaust flow from the combustion source, and a sensor disposed within the passageway. The sensor may generate a signal indicative of the concentration of a constituent in the exhaust flow. The exhaust system may also include a controller in communication with the sensor to receive the signal. The controller may be configured to selectively communicate a flow of calibration gas with the sensor during operation of the combustion source, and compare the signal received during the selective communication with a reference value. The controller may also be configured to adjust the sensor output in response to the comparison.

Another aspect of the present disclosure is directed to a method of calibration. This method may include generating a flow of exhaust, determining the concentration of a constituent in the exhaust flow, and generating a signal in response to the determination. The method may further include determining the concentration of the constituent in a calibration gas, and comparing the concentration of the constituent in the calibration gas to a known concentration of the constituent. The method may also include adjusting the value of the signal in response to the comparison. The steps of determining the concentration of the constituent in the calibration gas, comparing, and adjusting are completed simultaneous with the step of generating.

DETAILED DESCRIPTION

Figure 1:
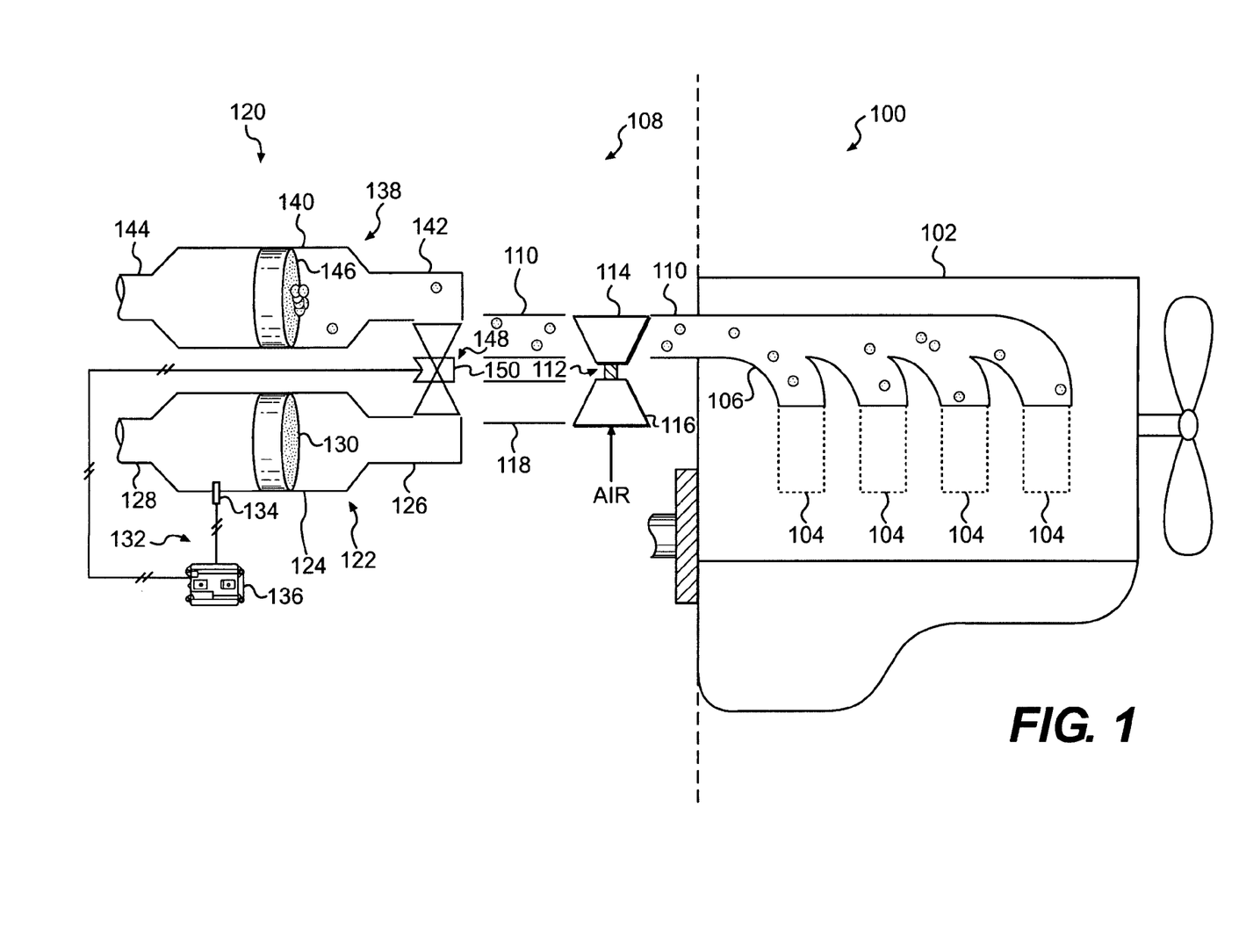
FIG. 1 is a schematic and diagrammatic illustration of an exemplary disclosed power unit and exhaust system.

FIG. 1 illustrates a power unit 100 having an exhaust system 108. For the purposes of this disclosure, power unit 100 is depicted and described as a four-stroke diesel engine. One skilled in the art will recognize, however, that power unit 100 may be any other type of internal combustion engine such as, for example, a gasoline engine, a gaseous fuel-powered engine, or a turbine engine. Further, power unit 100 may be any other type of power and exhaust producing device such as, for example, a furnace. Power unit 100 may include an engine block 102 that at least partially defines a plurality of combustion chambers 104. In the illustrated embodiment, power unit 100 includes four combustion chambers 104. However, it is contemplated that power unit 100 may include a greater or lesser number of combustion chambers 104 and that combustion chambers 104 may be disposed in an "in-line" configuration, a "V" configuration, or any other suitable configuration.

Operation of power unit 100 may produce power and exhaust. For example, each combustion chamber 104 may mix fuel with air and combust the mixture therein to produce exhaust directed into an exhaust passageway 106. The exhaust may contain carbon monoxide, oxides of nitrogen, carbon dioxide, aldehydes, soot, oxygen, nitrogen, water vapor, and/or hydrocarbons such as hydrogen and methane.

Exhaust system 108 may direct exhaust from combustion chambers 104 to the atmosphere and may include an exhaust manifold 110 in fluid communication with each exhaust passageway 106, a turbocharger 112 with a turbine 114 and a compressor 116, an emission treatment system 120, and a sensor control system 132. Turbine 114 may be disposed in fluid communication with exhaust manifold 110 such that, as the exhaust gases exiting power unit 100 expand against the blades (not shown) of turbine 114, turbine 114 may be caused to rotate, thereby rotating compressor 116. Compressor 116 may be positioned to direct a calibration gas, such as air, along a passageway 118 running parallel to exhaust manifold 110. It is contemplated that more than one turbocharger 112 may be included within exhaust system 108 and disposed in a parallel or series relationship. It is also contemplated that turbocharger 112 may alternatively be omitted and the calibration gas directed through passageway 118 in another manner. It is also contemplated that an exhaust passageway (not shown) other than exhaust manifold 110 may be positioned to direct the exhaust flow out of turbine 114.

Emission treatment system 120 may include a first flow path 122, a second flow path 138, and a valve 148. First flow path 122 may comprise a housing 124 having an inlet 126 and an outlet 128. Housing 124 may contain an exhaust treatment device 130 such as a particulate trap including a filtering element and/or a catalyst device. For example, the filtering element may be disposed within housing 124 to remove particulates from the exhaust flow, and the catalyst device may be disposed within housing 124 upstream or downstream of the filtering element to oxidize particulate matter in the exhaust flow, to facilitate regeneration of the filtering element, or to remove another exhaust constituent by adsorption or absorption.

Second flow path 138 may also comprise a housing 140. Similarly to housing 124, housing 140 may also have an inlet 142 and an outlet 144, and contain an exhaust treatment device 146. Exhaust treatment device 146 may also be a particulate trap including a filtering element and/or a catalyst device.

Valve 148 may selectively direct the exhaust from exhaust manifold 110 and the calibration gas from passageway 118 to first flow path 122 and second flow path 138. Valve 148 may block or substantially restrict exhaust or calibration gas flow through one or both of flow paths 122, 138. More specifically, if valve 148 is blocking the exhaust flow through first flow path 122, it may simultaneously allow the calibration gas flow through first flow path 122. When exhaust is blocked from first flow path 122, second flow path 138 may be opened to receive the exhaust. The movement of valve 148 may be controlled in response to an electronic, hydraulic, pneumatical, and/or mechanical control signal.

Sensor control system 132 may include a sensor 134 and a controller 136. Sensor 134 may be a gas sensor including a sensing electrode (not shown), an output line (not shown), a calibration input (not shown), and a power input (not shown). The sensing electrode may be sensitive to a specific gas or family of gases such as, for example, oxides of nitrogen (NOx). The output line may drive a voltage or current corresponding to the amount of gas sensed by the sensing electrode. The relationship between the amount of gas sensed and the magnitude of the driven output signal may be linear. For example, the output line may drive an output signal of 1 mA when the sensing electrode is in the presence of 30 ppm NOx, while the output line may drive an output signal of 0.5 mA when the sensing electrode is in the presence of 15 ppm NOx. It is contemplated that the relationship between the amount of gas sensed by sensor 134 and the magnitude of the driven output signal may alternatively be non-linear, if desired.

The calibration input to sensor 134 may receive a reference signal to calibrate sensor 134. For example, sensor 134 may be calibrated by driving the desired sensor output signal into the calibration input when the measured gas is at a predetermined level. More specifically, with reference to the predetermined NOx level of 15 ppm, a signal of 0.5 mA may be driven into the calibration input in order to center the output of sensor 134 to 0.5 mA when the sensing electrode senses 15 ppm NOx. Alternatively, the calibration input to sensor 134 may receive a reference value while sensor 134 is exposed to a predetermined level of the measured gas. For example, while sensor 134 is exposed to a known concentration of 15 ppm NOx, the calibration input may receive a signal of 0.5 mA in order to center the output of sensor 134 to 0.5 mA when the sensing electrode is exposed to 15 ppm NOx. The calibration input may be accompanied by an additional digital input that is set high or low to indicate that sensor 134 should be calibrated using the signal received at the calibration input, or that the signal received at the calibration input should be ignored.

The power input to sensor 134 may be one or more DC voltage lines required to power integrated circuitry involved in the implementation of sensor 134. It is contemplated that one or more of the exemplary features of sensor 134 may be omitted, provided that sensor 134 may sense the amount of a gas or constituent thereof at a particular location and produce an output signal corresponding to the same. Sensor 134 may be disposed within first flow path 122, either upstream or downstream of exhaust treatment device 130.

Controller 136 may embody a single microprocessor or multiple microprocessors that include a means for calibrating sensor 134. For example, controller 136 may include a memory, a secondary storage device, and a processor, such as a central processing unit or any other means for calibrating sensor 134 with a particular calibration gas. Numerous commercially available microprocessors can be configured to perform the functions of controller 136. It should be appreciated that controller 136 could readily embody a general power source microprocessor capable of controlling numerous power source functions. Various other known circuits may be associated with controller 136, including power supply circuitry, signal-conditioning circuitry, solenoid driver circuitry, communication circuitry, and other appropriate circuitry. It should also be appreciated that controller 136 may include one or more of an application-specific integrated circuit (ASIC), a field-programmable gate array (FPGA), a computer system, and a logic circuit, configured to allow controller 136 to function in accordance with the present disclosure. Thus, the memory of controller 136 may embody, for example, the flash memory of an ASIC, flip-flops in an FPGA, the random access memory of a computer system, or a memory circuit contained in a logic circuit. Controller 136 may be further communicatively coupled with an external computer system, instead of or in addition to including a computer system.

Although not illustrated, controller 136 may be communicatively coupled with input and output components such as, for example, a computer monitor, a printer, an alarm, a warning light, and a direct input button or switch. The computer monitor, printer, alarm, and/or warning light may be activated in response to fault conditions. The direct input button or switch may activate or deactivate aspects of controller's 136 functions, and may allow a user to interface with controller 136.

Controller 136 may receive the signal generated by sensor 134. More specifically, controller 136 may monitor the signal generated by sensor 134 during normal, non-calibration operations. Furthermore, controller 136 may receive a signal from sensor 134 when sensor 134 is exposed to the calibration gas.

Controller 136 may initiate a calibration routine to calibrate sensor 134. For example, controller 136 may initiate a calibration routine if one or more of the following events occurs: the routine is manually triggered by a user interfaced with controller 136; a predetermined time interval has passed; the signal generated by sensor 134 during non-calibration operation falls outside of a pre-determined range; and/or the signal generated by sensor 134 during non-calibration operation changes erratically. More specifically, controller 136 may run a calibration routine when a user presses a button or toggles a switch, if twenty-four hours have passed since the last calibration routine, if the signal generated by sensor 134 falls below 0.01 mA or rises above 1.5 mA, or if the signal generated by sensor 134 does not settle within a 0.05 mA range for longer than one minute.

Controller 136 may also communicate with valve actuator 150 to move valve 148 between flow-passing and flow-blocking positions. For example, controller 136 may actuate valve 148 to selectively direct the calibration gas from passageway 118 and the exhaust from exhaust manifold 110 to first flow path 122 and second flow path 138, respectively. More specifically, controller 136 may initiate a calibration routine by controlling valve actuator 150 to cause valve 148 to direct the airflow through first flow path 122 and simultaneously direct the exhaust flow through second flow path 138. Similarly, controller 136 may return sensor 134 to normal operation by controlling valve actuator 150 to direct the exhaust flow through first flow path 122 and to shut off the airflow.

Controller 136 may compare the output generated by sensor 134 during the calibration routine to a reference value stored in memory. The reference value may include the magnitude and/or polarity of current or voltage that is expected from sensor 134 when sensor 134 is exposed to the calibration gas. Controller 136 may further compensate for a deviation in the calibration signal with respect to the reference value by adjusting the output of sensor 134 to match the calibration signal with the expected reference value. In an exemplary embodiment, controller 136 may be equipped with a program that determines the difference between the calibration signal and the reference signal, and adjusts all subsequent signals generated by sensor 134 by that difference.

In another exemplary embodiment, controller 136 may be equipped with circuitry that shifts signals generated by sensor 134 by the error difference. For example, controller 136 may include a controllable DC voltage or current source that runs in series or parallel with signals generated by sensor 134. Controller 136 may set the magnitude and polarity of the voltage or current source to bias signals generated by sensor 134 such that, when it is summed with the calibration signal, the resulting adjusted signal substantially matches the reference value.

In yet another exemplary embodiment, controller 136 may directly calibrate sensor 134 by providing sensor 134 with the reference value, as discussed above. For example, the calibration gas may contain a predetermined NOx level of 15 ppm. While sensor 134 is exposed to the calibration gas, controller 136 may drive a signal of 0.5 mA into the calibration input to set the output of sensor 134 to 0.5 mA when sensor 134 is in the presence of 15 ppm NOx.

Controller 136 may log a fault when the signal generated by sensor 134 is other than expected. Examples of fault conditions may include, without limitation, a deviation in the signal generated by sensor 134 from a predetermined threshold of values during non-calibration operation or during a calibration routine, deviation in the signal generated by sensor 134 from a predetermined reference value during a calibration routine, erratic changes in the signal generated by sensor 134 over a predetermined time interval, frequency of calibration routines above a predetermined threshold, and/or frequency of logged faults above a predetermined threshold. Controller 136 may log faults by outputting them to a user interface (not shown) such as a computer screen or printer, listing them in a log file stored in memory or storage, activating an alarm (not shown) or a warning light (not shown), or possibly by reducing power to or shutting down power unit 100. It is also contemplated that, rather than or in addition to logging a fault condition, controller 136 may track and record the detected signal generated by sensor 134.

Controller 136 may further receive and/or change values necessary for operation consistent with the present disclosure. Such values may include, without limitation, the acceptable range of values for the signal generated by sensor 134, the expected signal generated by sensor 134 when exposed to the calibration gas, the time interval during which the signal generated by sensor 134 is expected to reach a solid state, the acceptable frequency threshold of calibration routines, and the acceptable frequency threshold of logged faults. Controller 136 may receive any of these values into memory or storage, or as a signal input to a circuit.

Figure 2:
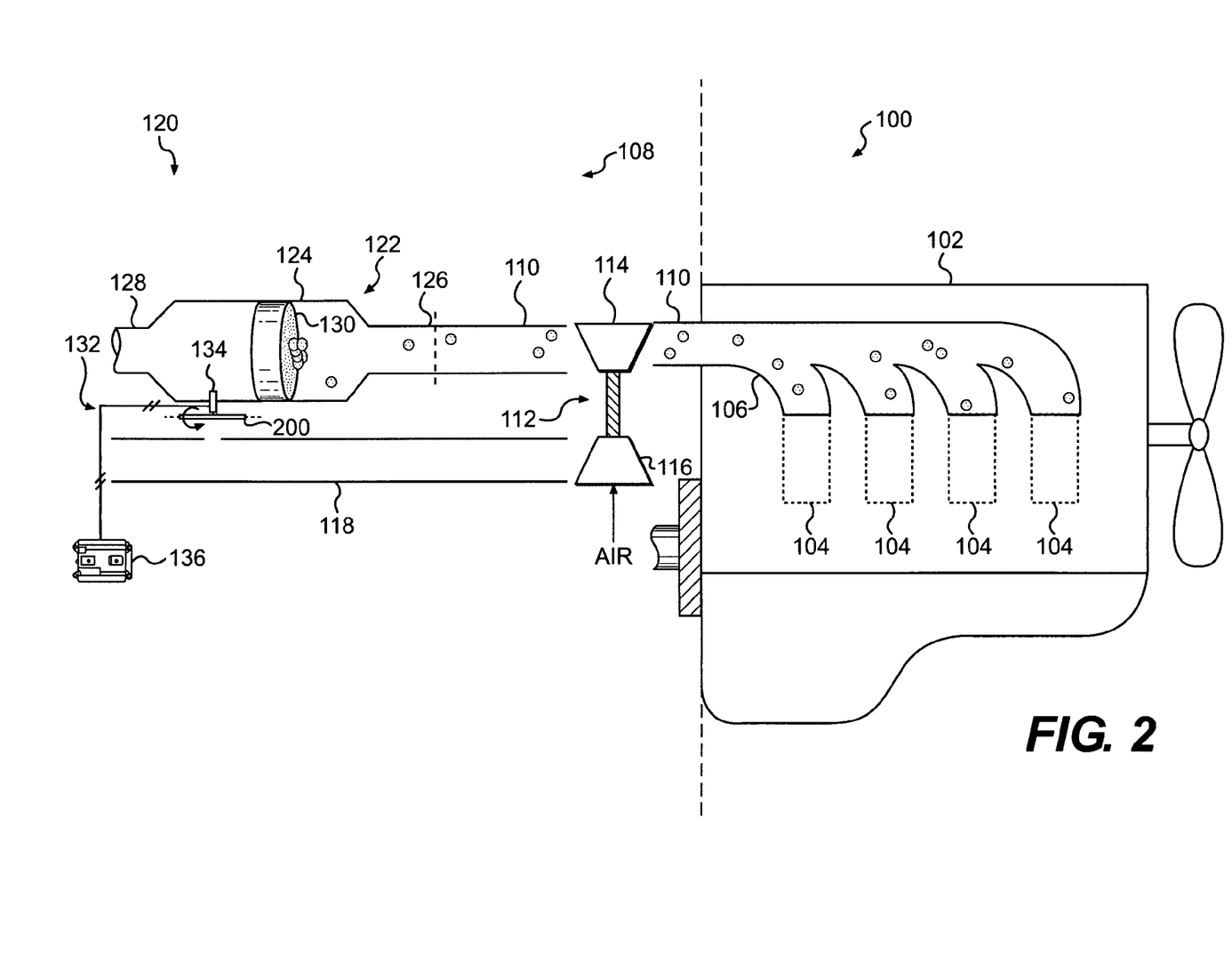
FIG. 2 is a schematic and diagrammatic illustration of another exemplary disclosed power unit and exhaust system.

Alternative embodiments may employ different sensor and/or exhaust system configurations from the exemplary embodiment disclosed above. For example, FIG. 2 illustrates a second exemplary embodiment that may include only a single flow path 122 for the exhaust flow. In this configuration, a pivoting mechanism 200 may be positioned to pivot sensor 134 out of flow path 122 and into a calibration gas passageway 118. Controller 136 may control the motion of pivoting mechanism 200, allowing for a calibration routine to be initiated. Similarly, controller 136 may control the motion of pivoting mechanism 200 to turn sensor 134 back into flow path 122 at the close of the calibration routine. Alternatively, passageway 118 may be omitted and controller 136 may simply pivot sensor 134 out of the exhaust flow into atmospheric surroundings, and back into the exhaust flow at the completion of the routine.

Figure 3:
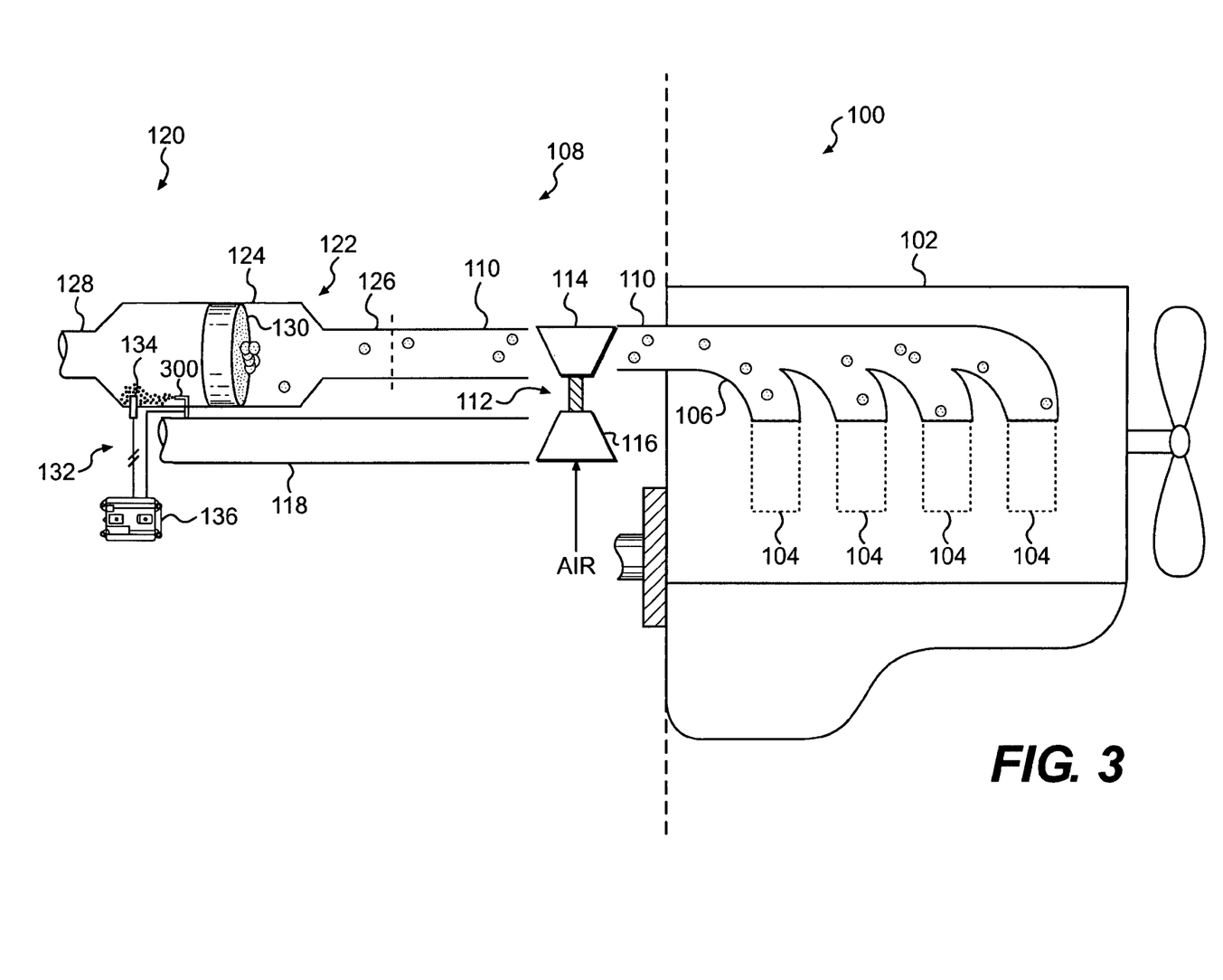
FIG. 3 is a schematic and diagrammatic illustration of yet another exemplary disclosed power unit and exhaust system.

In a third exemplary embodiment, illustrated in FIG. 3, controller 136 may be communicatively coupled with a pressurized calibration gas injector 300 located within flow path 122. Pressurized calibration gas injector 300 may include an electromechanical valve configured to allow, block, or partially block the escape of pressurized calibration gas into housing 124 in the vicinity of sensor 134. Controller 136 may actuate the release of the pressurized calibration gas and/or regulate the pressure of the calibration gas, thereby forcing exhaust away from sensor 134 to initiate the calibration routine. Similarly, controller 136 may actuate the blockage of or reduce the pressure of the calibration gas to allow sensor 134 to return to non-calibration operation.

INDUSTRIAL APPLICABILITY

The disclosed sensor control system and calibration method may be applicable to any combustion-type device including, for example, an engine, a furnace, and other similar devices known in the art. In fact, the disclosed sensor control system and method of in situ calibration may be implemented into any combustion system that benefits from sensor calibration without interrupting operation of the system. Power unit 100 may illustrate an exemplary power system and may operate constantly or over long periods of time without interruption. The operation of power unit 100 will now be explained.

Referring to FIG. 1, air and fuel may be drawn into the combustion chambers 104 of power unit 100 for subsequent combustion. Fuel may be injected into combustion chambers 104, mixed with the air therein, and combusted by power unit 100 to produce a mechanical work output and an exhaust flow of hot gases. The exhaust flow may contain a complex mixture of air pollutants composed of gaseous material, which can include oxides of nitrogen (NOx). As this NOx laden exhaust flow is directed from combustion chambers 104 through exhaust manifold 110 to emission treatment system 120, NOx concentration may be reduced from the exhaust flow by way of exhaust treatment device 130. The exhaust flow, with some acceptable level of remaining NOx, may then flow out of emission treatment system 120 and into the atmosphere. Further, the exhaust flow through exhaust manifold 110 may drive turbine 114 causing compressor 116 to direct air through passageway 118.

Figure 4:
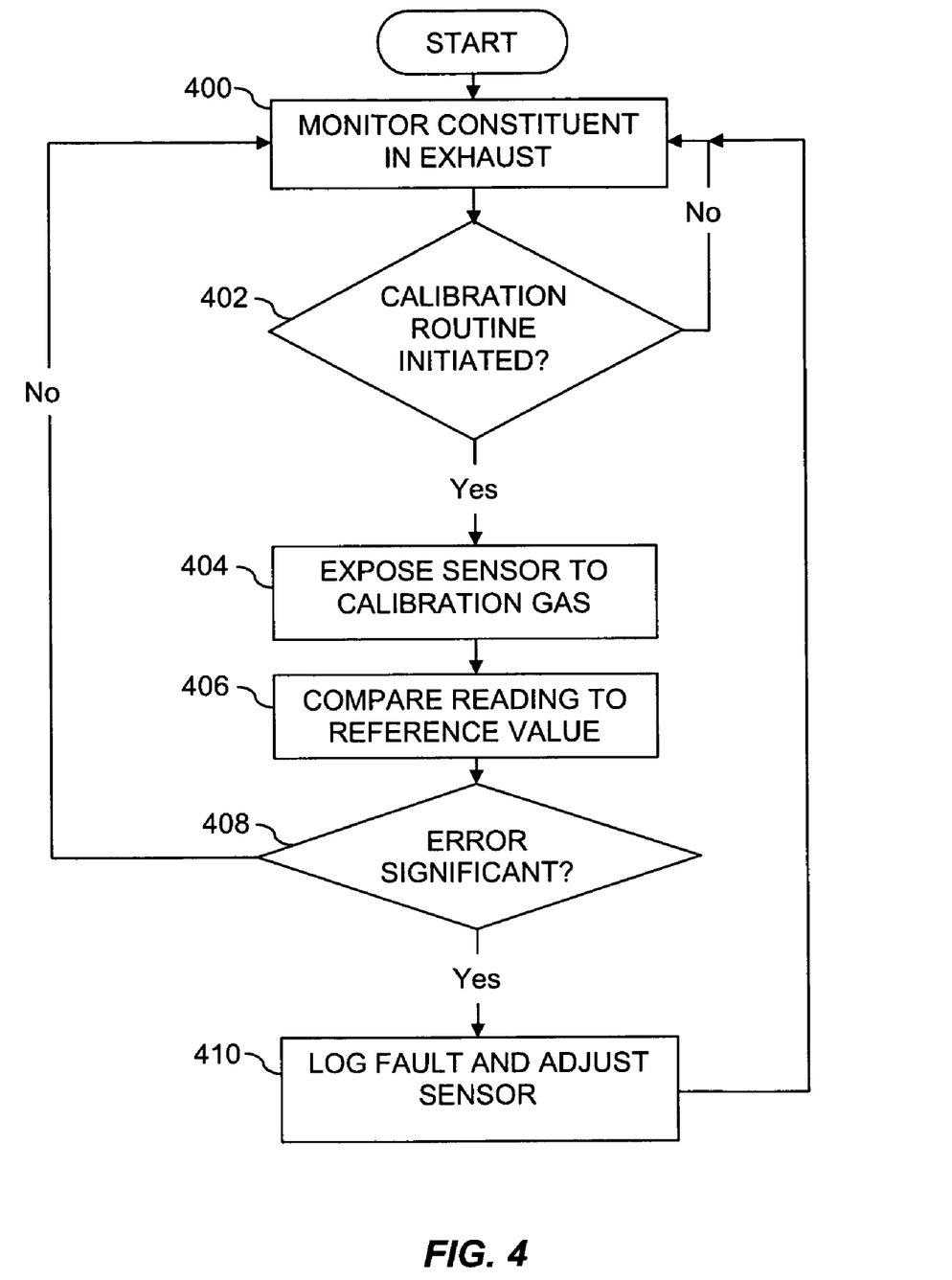
FIG. 4 is a flowchart depicting an exemplary disclosed method of operating the exhaust systems of FIGS. 1-3.

Sensor 134 may be sensitive to NOx in its immediate environment. As the exhaust flow passes sensor 134, sensor 134 may produce a signal indicative of the NOx concentration in the exhaust flow. Readings from sensor 134 may be used to ensure that NOx concentration is within tolerable levels. FIG. 4 illustrates an exemplary operation of sensor control system 132.

Sensor 134 may monitor NOx levels in the exhaust flow as it passes through the vicinity of sensor 134 during the operation of power unit 100 (Step 400). Over time, sensor 134 and other components affecting the sensor's readings may become corroded, covered with layers of dirt, exposed to temperature extremes, or suffer other performance degrading effects. As a result, sensor 134 may occasionally require calibration to ensure that its readings are not adversely affected. Since power unit 100 may operate constantly or for long periods of time without interruption, it may be undesirable to calibrate sensor 134 using traditional means involving the removal of sensor 134 or inoperation of power unit 100.

In situ calibration of sensor 134 may be triggered by any of a variety of events (Step 402), as exemplified above. One calibration routine may include exposing sensor 134 to a calibration gas with a predetermined concentration of NOx (Step 404). Once sensor 134 has been exposed to the calibration gas and controller 136 has obtained the calibration signal, controller 136 may compare the calibration signal to a reference value stored in memory (Step 406). The comparison of the calibration signal to the reference value may then be checked by controller 136 to determine whether or not the error in the calibration signal is significant (Step 408). For example, controller 136 may allow the calibration signal to differ from the reference value by an acceptable, relatively small amount, giving the calibration signal a relatively small range of acceptable values. If the calibration signal falls within this small range, the error may be determined to be insignificant by controller 136, and controller 136 may end the calibration routine and return sensor 134 to non-calibration operation. However, if the calibration signal falls outside of the small range, controller 136 may adjust the output of sensor 134 to fall within the small range and log a fault reporting the significant error (Step 410). The output of sensor 134 may be modified by several different methods, as exemplified above. The calibration routine may be initiated (Step 402) during operation of power unit 100. Further, each step of the calibration routine (Steps 404-410) is performed during operation of power unit 100. It is contemplated that some of Steps 400-410 may or may not be performed concurrently with each other.

It is further contemplated that sensor 134 may be exposed to a plurality of calibration gases with a plurality of concentrations of the calibration gas, and the signals generated by sensor 134 in response to each of the calibration gases used to calibrate sensor 134. For example, Step 404 may include sequentially exposing sensor 134 to three different calibration gases with NOx concentrations of 5 ppm, 15 ppm, and 25 ppm, respectively. Steps 406, 408 may then be completed with respect to each of the signals generated by sensor 134 corresponding to each of the calibration gases. That is, controller 136 may compare each signal to a reference value corresponding to the known concentration of NOx in the calibration gas that sensor 134 was exposed to when generating that signal, and determine the errors in the signals. Step 410 may then be completed with respect to each of the determined errors.

Once a fault is logged and the output of sensor 134 is adjusted (Step 410), controller 136 may end the calibration routine and return sensor 134 to non-calibration operation. Controller 136 may also take steps to accommodate the faults it generates. Various methods and configurations may be used to realize the steps of a calibration routine. For example, controller 136 may expose sensor 134 to the calibration gas by actuating valve 148 to selectively direct the calibration gas through flow path 122, by controlling pivoting mechanism 200 to pivot sensor 134 out of flow path 122, or by injecting pressurized calibration gas into the vicinity of sensor 134. The calibration gas may be air, which contains approximately 0.02 ppm NOx.

The method of sensor calibration described in the present disclosure may allow for the calibration of a sensor within an exhaust treatment system that can be applied to machines that operate both continuously and intermittently. Specifically, because the system provides its own source of calibration gas, it may not depend on shutdown of power unit 100. Additionally, the methods may be employed to calibrate the sensor while the machine is not in operation.

Further, since the calibration of the sensor may occur during operation of the machine, the readings from the sensor may not drift undesirably during operation, depending on the time duration between calibration routines. The method may also account for other changing factors in the power unit and exhaust system that may or may not be directly related to the sensor. If the readings from the sensor do drift undesirably during operation, the disclosed method may prevent this undesirable drift from persisting.

It will be apparent to those skilled in the art that various modifications and variations can be made to the exhaust system of the present disclosure without departing from the scope of the disclosure. Other embodiments will be apparent to those skilled in the art from consideration of the specification and practice of the exhaust system disclosed herein. It is intended that the specification and examples be considered as exemplary only, with a true scope of the disclosure being indicated by the following claims and their equivalents.

What is claimed is:

1. An exhaust system for a combustion source, the exhaust system comprising:
a passageway permanently associated with the combustion source and connected to receive an exhaust flow from the combustion source;
a sensor permanently associated with the combustion source and disposed within the passageway to generate a signal indicative of a concentration of a constituent in the exhaust flow; and
a controller in communication with the sensor to receive the signal, the controller being configured to:
selectively coordinate communication of a flow of calibration gas with the sensor during operation of the combustion source;
compare the signal received during the selective communication with a reference value; and
adjust sensor output in response to the comparison.

2. The exhaust system of claim 1, wherein the passageway is a first passageway and the exhaust system further includes:
a second passageway connected to receive the exhaust flow; and
a valve controlled to selectively direct the exhaust to the first passageway during non-calibration operation and to direct the exhaust to the second passageway and the calibration gas to the first passageway during calibration operation.

3. The exhaust system of claim 1, wherein the sensor is connected to move out of the passageway and into the calibration gas during calibration operation of the sensor, and back into the passageway during non-calibration operation of the sensor.

4. The exhaust system of claim 3, wherein:
the passageway is a first passageway and the exhaust system further includes a second passageway connected to receive a flow of the calibration gas; and
the sensor is connected to pivot between the first and the second passageways.

5. The exhaust system of claim 1, wherein the calibration gas is pressurized and directed into the passageway in the vicinity of the sensor only during calibration operation of the sensor while exhaust is flowing through the passageway.

6. The exhaust system of claim 1, wherein the flow of calibration gas is automatically communicated with the sensor in response to at least one of the following events:
an end of a predetermined time interval of exhaust system operation; and
a value of the signal deviating from an expected range during non-calibration operation of the sensor.

7. The exhaust system of claim 1, wherein the adjustment is performed by at least one of: computerized manipulation of the signal, integrated logic circuitry, or an adjustment to sensor hardware.

8. The exhaust system of claim 1, further including an exhaust constituent reducing device located upstream of the sensor.

9. The exhaust system as in claim 1, wherein the controller is further configured to log a fault when the value of the signal deviates from an expected range.

10. A power system, comprising:
the exhaust system as in claim 1,
wherein:
the combustion source is an internal combustion engine configured to combust an air/fuel mixture and produce a power output and the flow of exhaust;
the combustion gas is air; and
the constituent is an oxide of nitrogen;
a turbocharger located upstream of the sensor to receive the flow of exhaust and pressurize the flow of calibration gas; and
a NOx reducing device located between the turbocharger and the sensor.

11. A method of calibration, comprising:
pressurizing a gas:
directing pressurized gas to an engine for combustion that generates a flow of exhaust;
detecting a concentration of a constituent in the exhaust flow and generating a signal in response thereto during a non-calibration operation;
selectively detecting the concentration of the constituent in the pressurized gas during a calibration operation;
comparing the concentration of the constituent in the pressurized gas to a known concentration of the constituent; and
adjusting at least one of the detecting and the signal in response to the comparison, wherein the step of detecting the concentration of the constituent in the pressurized gas, comparing, and adjusting are completed simultaneously with the step of directing.

12. The method of claim 11, further including directing the generated exhaust flow through a first path during non-calibration operation or a second path during calibration operation.

13. The method of claim 11, wherein the location for detecting the concentration of a constituent in the exhaust flow is different than the location of detecting the concentration of the constituent in the pressurized gas.

14. The method of claim 11, further including directing pressurized gas into the exhaust flow upstream of a detecting location.

15. The method of claim 11, wherein the step of detecting the concentration of the constituent in the pressurized gas is automatically initiated in response to one or more of the following events:
an end of a predetermined time interval of engine operation; and
the detected concentration of the constituent in the exhaust flow.

16. The method of claim 11, further including signaling a fault to users of the exhaust system.

17. The method of claim 11, wherein the gas is air.

18. The method of claim 11, wherein the constituent is an oxide of nitrogen.

19. The exhaust system of claim 1, wherein the gas is pressurized by a turbocharger that is driven by the exhaust flow.

20. The method of claim 17, wherein the air is pressurized by a turbocharger that is driven by the flow of exhaust.

21. A power system, comprising:
a combustion source;
a passageway fixedly connected to receive an exhaust flow from the combustion source and direct the exhaust flow to the atmosphere;
an onboard sensor disposed within the passageway to generate a signal indicative of a concentration of a constituent in the exhaust flow during non-calibration operation of the sensor; and
a controller in communication with the sensor to receive the signal, the controller being configured to:
selectively coordinate communication of a flow of calibration gas with the sensor during calibration-operation of the sensor;

compare the signal received during the selective communication with a reference value; and adjust sensor output in response to the comparison, wherein the calibration gas is pressurized and directed into the passageway in the vicinity of the sensor only during calibration operation of the sensor and while exhaust is flowing through the passageway.

22. A power system, comprising:

a combustion source;

a passageway fixedly connected to receive an exhaust flow from the combustion source and direct the exhaust flow to the atmosphere;

an onboard sensor disposed within the passageway to generate a signal indicative of a concentration of a constituent in the exhaust flow during non-calibration operation of the sensor; and a controller in communication with the sensor to receive the signal, the controller being configured to:

selectively communicate a flow of calibration gas with the sensor during calibration operation of the sensor;

compare the signal received during the selective communication with a reference value; and adjust sensor output in response to the comparison, wherein the sensor is connected to move out of the passageway and into the calibration gas during calibration operation of the sensor, and back into the passageway during non-calibration operation of the sensor.

* * * * *